(12) United States Patent
Suzuki

(10) Patent No.: US 8,064,690 B2
(45) Date of Patent: Nov. 22, 2011

(54) COLOR PROFILE CREATING APPARATUS AND COLOR PROFILE CREATION METHOD

(75) Inventor: Hiroaki Suzuki, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 765 days.

(21) Appl. No.: 12/134,530

(22) Filed: Jun. 6, 2008

(65) Prior Publication Data

US 2009/0010534 A1    Jan. 8, 2009

(30) Foreign Application Priority Data

Jul. 3, 2007 (JP) ................................. 2007-175098

(51) Int. Cl.
  *G06K 9/00* (2006.01)
(52) U.S. Cl. ............................ 382/162; 358/1.9; 382/166
(58) Field of Classification Search .................. 382/162, 382/166, 167, 232; 358/518
See application file for complete search history.

(56) References Cited

U.S. PATENT DOCUMENTS

| | | | |
|---|---|---|---|
| 5,831,751 A | 11/1998 | Ohneda et al. | |
| 6,005,970 A | 12/1999 | Ohneda et al. | |
| 6,111,605 A | 8/2000 | Suzuki | |
| 6,380,975 B1 | 4/2002 | Suzuki | |
| RE38,759 E | 7/2005 | Suzuki | |
| 7,003,176 B1 | 2/2006 | Suzuki et al. | |
| 7,221,483 B2 | 5/2007 | Yagishita et al. | |
| 7,345,787 B2 * | 3/2008 | Ito et al. ........................ | 358/1.9 |
| 7,463,386 B2 * | 12/2008 | Misumi .......................... | 358/1.9 |
| 7,706,605 B2 * | 4/2010 | Fukao et al. .................. | 382/162 |
| 2002/0130956 A1 | 9/2002 | Suzuki | |
| 2005/0008258 A1 | 1/2005 | Suzuki et al. | |
| 2005/0237544 A1 | 10/2005 | Suzuki et al. | |
| 2006/0170939 A1 | 8/2006 | Misumi | |

FOREIGN PATENT DOCUMENTS

| | | |
|---|---|---|
| EP | 0 785 672 | 7/1997 |
| EP | 0 961 488 | 12/1999 |
| JP | 2002-171418 | 6/2002 |
| JP | 2002-252785 | 9/2002 |
| JP | 2003-136683 | 5/2003 |
| JP | 2005-269503 | 9/2005 |

OTHER PUBLICATIONS

U.S. Appl. No. 07/572,135, filed Aug. 22, 1990, Hiroaki Suzuki.

* cited by examiner

*Primary Examiner* — Jason M Repko
*Assistant Examiner* — Siamak Harandi
(74) *Attorney, Agent, or Firm* — Oblon, Spivak, McClelland, Maier & Neustadt, L.L.P.

(57) ABSTRACT

Colorimetric data of a tone patch of a specific color is transmitted from a specific-color-data extracting unit to a hue characteristic calculator, to obtain a hue characteristic of the colorimetric data. A replacement data generator generates replacement data by performing hue correction for reflecting the hue characteristic with respect to second gamut data corresponding to the specific color. A specific-color-data replacing unit replaces the second gamut data corresponding to the specific color with the replacement data, and color target data after such a replacement process is gamut compressed from the second gamut to third gamut by a gamut compressing unit.

9 Claims, 12 Drawing Sheets

| FIRST GAMUT DATA | | | SECOND GAMUT DATA | | | SPECIFIC COLOR FLAG |
|---|---|---|---|---|---|---|
| R | G | B | L* | a* | b* | |
| R [1, 0] | G [1, 0] | B [1, 0] | L* [2, 0] | a* [2, 0] | b* [2, 0] | 1 |
| R [1, 1] | G [1, 1] | B [1, 1] | L* [2, 1] | a* [2, 1] | b* [2, 1] | 2 |
| . | . | . | . | . | . | . |
| . | . | . | . | . | . | . |

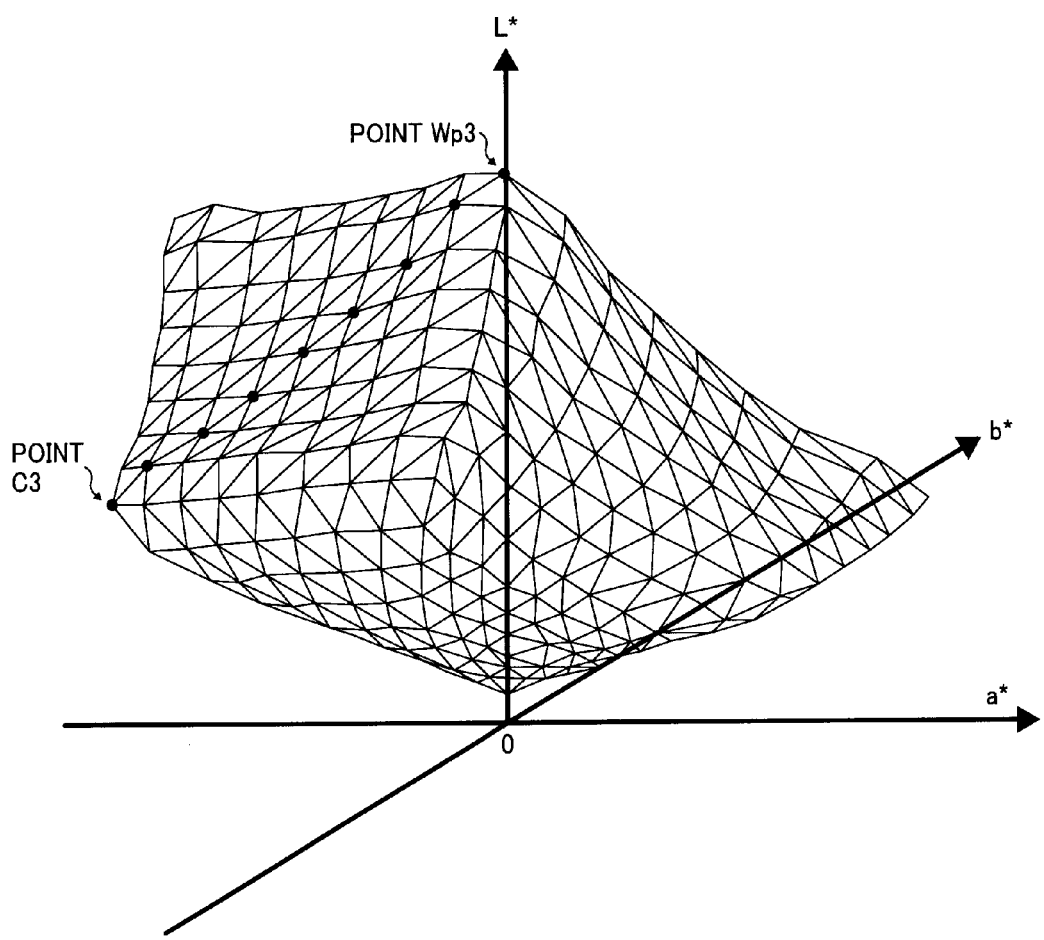

COLOR PROFILE CREATING APPARATUS AND COLOR PROFILE CREATION METHOD

CROSS-REFERENCE TO RELATED APPLICATIONS

The present application claims priority to and incorporates by reference the entire contents of Japanese priority document, 2007-175098 filed in Japan on Jul. 3, 2007.

BACKGROUND OF THE INVENTION

1. Field of the Invention

The present invention relates to a technique for creating a color profile (color conversion profile) used for converting a color signal having a certain color reproduction area (gamut) to a color signal for a color-image output device having a more restricted gamut.

2. Description of the Related Art

For example, when image data displayed on an sRGB-compliant color-image display apparatus is output by the color-image output device such as a color printer in which the gamut is more restricted than that of the color-image display apparatus, conversion from an RGB signal (input color signal) to a color signal (output color signal) such as a CMYK signal appropriate for the color-image output device is required.

The color profile used for the conversion is created, in many cases, as a three-dimensional or four-dimensional look-up table in which an sRGB space is divided into cubes of the same type, and an output color signal value is stored at an address of each lattice point (determined by an RGB value).

When such a color profile is to be created, for example, a following procedure is used. That is, after the RGB value at each lattice point in the sRGB space is converted to color data in a perceptual space such as CIELAB or CIECAM02, which is a device-independent color space, and then gamut conversion to the gamut of the color-image output device is performed, to convert the gamut-compressed color data to an output color signal value for the color-image output device, and a look-up table is created in which the output color signal value is stored at an address corresponding to the lattice point.

As well known, sRGB is an international standard of the color space planned by the International Electrotechnical Committee (IEC), the CIELAB is an international standard of a uniform color space determined by the International Commission on Illumination (CIE) and also specified by the Japanese Industrial Standard (JIS), and the CIECAM02 (Color Appearance Model 2002) is a color appearance model issued by the CIE in 2004.

FIGS. 14A and 14B are schematic diagrams for explaining gamut compression in the CIELAB space. In FIG. 14A, the gamut outermost periphery in a certain hue (that is, the outermost periphery of the sRGB space in the hue) of the sRGB-compliant color-image display apparatus is expressed by a solid line, and the gamut outermost periphery in a certain hue of the color image output device is expressed by a broken line. Gamut compression is processing such that it is determined whether an L*a*b* value corresponding to each lattice point in the sRGB space is inside or outside of the gamut of the color image output device, and when the value is outside the gamut, the L*a*b* value is mapped to an L*a*b* value on the gamut outermost periphery (that is, compressed), and when the value is inside the gamut, the L*a*b* value is mapped to the same L*a*b* value (that is, not compressed). Various methods are known, as shown in FIG. 14B, according to how to decide a mapping destination of the L*a*b* value outside the gamut, that is, a method of compressing the L*a*b* value so that a color difference before and after the compression becomes minimum, a method of compressing the L*a*b* value so that luminance before the compression is stored, a method of compressing the L*a*b* value so that chroma before the compression is stored, and a method referred to as perceptual mapping in which the chroma in the gamut of the color-image display apparatus is relatively replaced by the gamut of the color-image output device (for example, see Japanese Patent Application Laid-open No. 2002-252785). FIGS. 14A and 14B depict an example in which a point s on the gamut outermost periphery of the color-image display apparatus is mapped to a point t having the smallest color difference (the smallest distance) on the gamut outermost periphery of the color-image output device.

When the size and the shape of the gamut of the color-image display apparatus and the gamut of the color-image output device are largely different, the degree of freedom in selection of the color on the gamut outermost periphery (for example, the point t) to be associated with the color outside the gamut (for example, the point s) of the color-image output device is large. This means that there is a large difference in correspondence of color data before and after gamut compression depending on a difference of capability of people involved in creation of the color profile, and on differences of the size and the shape of the gamut of the color-image output device. Because suitability of gamut compression directly affects the color reproduction performance of the color profile, it is desired to take measures to restrict such differences.

An effective prior technique to solve the above problem has been disclosed by Japanese Patent Application Laid-open No. 2002-252785, which is a patent application by the present applicant. In the color map creating apparatus shown in Japanese Patent Application Laid-open No. 2002-252785, two-stage gamut compression including an intervening virtual gamut is used. An outline of the two-stage gamut compression including the intervening virtual gamut is explained with reference to FIG. 15.

As shown in FIG. 15, for example, when gamut compression from the gamut of the sRGB-compliant color-image display apparatus (first gamut=sRGB space) to the gamut of the color-image output device (third gamut) is to be performed, a virtual gamut (second gamut) narrower than the first gamut and wider than the third gamut is set. Two-stage gamut compression is then performed such that an L*a*b* value at each lattice point obtained by performing cube division of the sRGB space is prepared as a representative color of the first gamut, these L*a*b* values are gamut compressed to the second gamut, and the L*a*b* values are then gamut compressed to the third gamut. FIG. 15 is an example of mapping of the point s on the first gamut outermost periphery to a point v on the second gamut outermost periphery, and mapping of the point v to the point t on the third gamut outermost periphery. Thus, by including the intervening virtual second gamut, the degree of freedom in conversion from the first gamut to the third gamut (the degree of freedom in correspondence from the point s to the point t) can be restricted.

For example, in the case of the color-image output device using cyan (C) color material, magenta (M) color material, yellow (Y) color material, and black (K) color material, there are demands for reproduction of a specific color, for example, to reproduce primary colors such as cyan and magenta only by one color material, to reproduce secondary colors such as red and blue only by two color materials, and the like.

SUMMARY OF THE INVENTION

It is an object of the present invention to at least partially solve the problems in the conventional technology.

According to an aspect of the present invention, there is provided a color profile creating apparatus including first gamut data having a first gamut, second gamut data obtained by compressing the first gamut data to a second gamut, and calorimetric data of a tone patch of a specific color output by a color-image output device having a third gamut. The color profile creating apparatus further includes a gamut compressing unit that compresses the second gamut data to the third gamut; a hue-characteristic obtaining unit that obtains a hue characteristic of the calorimetric data for the specific color; a replacement data generator that generates replacement data for the second gamut data, on which a tone characteristic of the second gamut data and the hue characteristic obtained by the hue-characteristic obtaining unit are reflected, based on the second gamut data corresponding to the first gamut data of the specific color; a data replacing unit that replaces the second gamut data corresponding to the first gamut data of the specific color with the replacement data generated by the replacement data generator, prior to a gamut compression by the gamut compressing unit; and a color-profile creating unit that creates a color profile for the color-image output device based on color data after the gamut compression by the gamut compressing unit and the first gamut data.

Furthermore, according to another aspect of the present invention, there is provided a color profile creating apparatus including first gamut data having a first gamut, second gamut data obtained by compressing the first gamut data to a second gamut, and calorimetric data of a tone patch of a specific color output by a color-image output device having a third gamut. The color profile creating apparatus further includes a gamut compressing unit that compresses the second gamut data to the third gamut; a hue-characteristic obtaining unit that obtains a hue characteristic of the calorimetric data; a tone-characteristic obtaining unit that obtains a tone characteristic of the second gamut data corresponding to the first gamut data of the specific color; a replacement data generator that generates replacement data for the second gamut data corresponding to the first gamut data of the specific color, on which the hue characteristic obtained by the hue-characteristic obtaining unit and the tone characteristic obtained by the tone-characteristic obtaining unit are reflected, based on the calorimetric data for the specific color; a data replacing unit that replaces the second gamut data corresponding to the first gamut data of the specific color with the replacement data generated by the replacement data generator, prior to a gamut compression by the gamut compressing unit; and a color-profile creating unit that creates a color profile for the color-image output device based on color data after the gamut compression by the gamut compressing unit and the first gamut data.

Moreover, according to still another aspect of the present invention, there is provided a color profile creating method including data obtaining including obtaining first gamut data having a first gamut, second gamut data obtained by compressing the first gamut data to a second gamut, and calorimetric data of a tone patch of a specific color output by a color-image output device having a third gamut; gamut compressing including compressing the second gamut data to the third gamut; hue-characteristic obtaining including obtaining a hue characteristic of the calorimetric data for the specific color; replacement data generating including generating replacement data for the second gamut data, on which a tone characteristic of the second gamut data and the hue characteristic obtained at the hue-characteristic obtaining are reflected, based on the second gamut data corresponding to the first gamut data of the specific color; data replacing including replacing the second gamut data corresponding to the first gamut data of the specific color with the replacement data generated at the replacement data generating, prior to a gamut compression at the gamut compressing; and color profile creating including creating a color profile for the color-image output device based on color data after the gamut compression at the gamut compressing and the first gamut data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic diagram for explaining third gamut data and a specific color flag;

FIG. 5 depicts a state where colorimetry of a cyan primary color on an outermost periphery of the third gamut expressed by a polygon is plotted;

DETAILED DESCRIPTION OF THE PREFERRED EMBODIMENTS

Exemplary embodiments of the present invention will be explained below in detail with reference to the accompanying drawings.

A first embodiment of the present invention is explained first.

Figure 1:
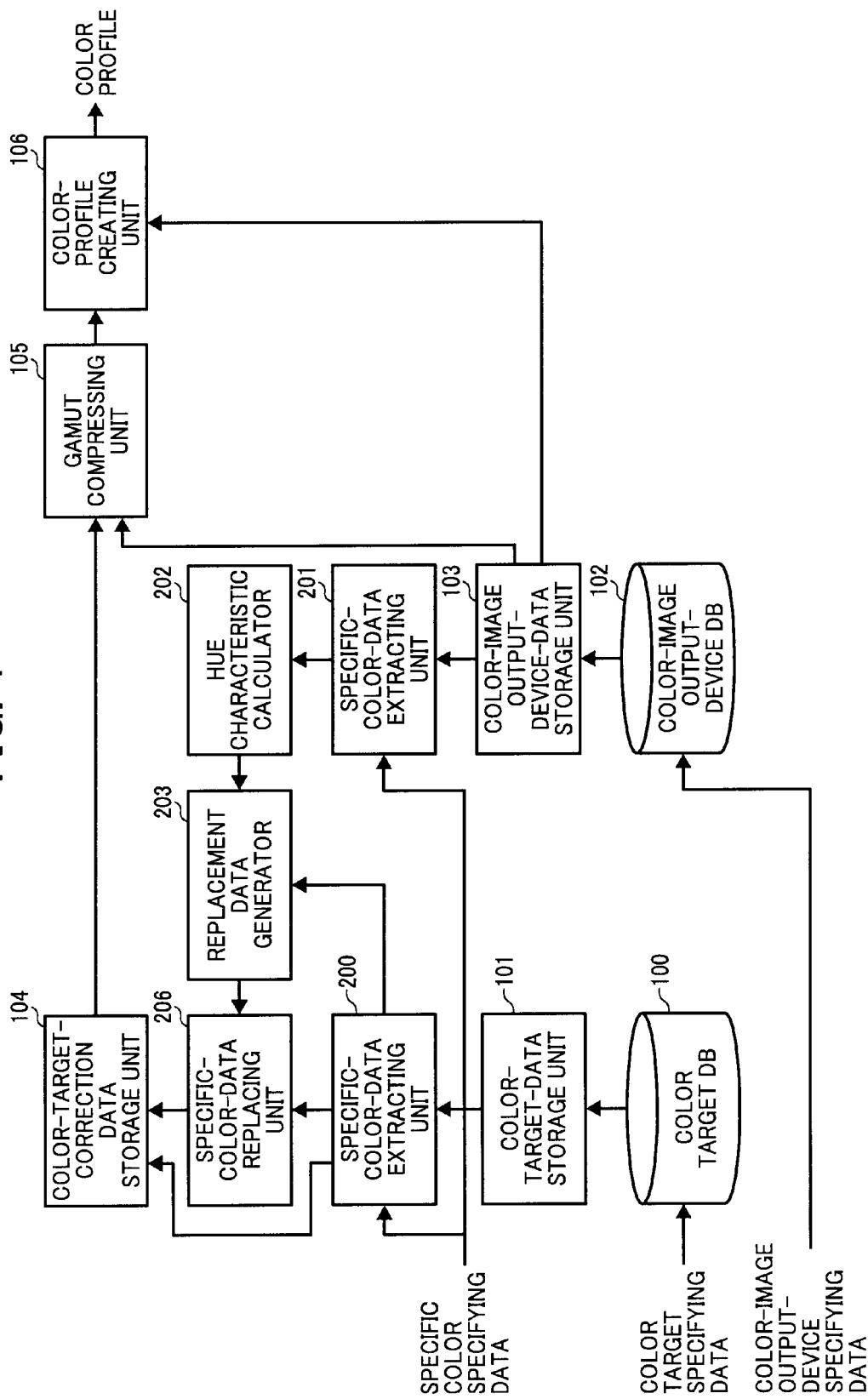
FIG. 1 is a block diagram of a color profile creating apparatus according to a first embodiment of the present invention.

FIG. 1 is a block diagram of a color profile creating apparatus according to the first embodiment. The color profile creating apparatus includes a color target database (DB) 100 that stores plural types of color target data and a color-image output-device DB 102 that stores data relating to plural types of color image output unit.

Figures 2, 3:
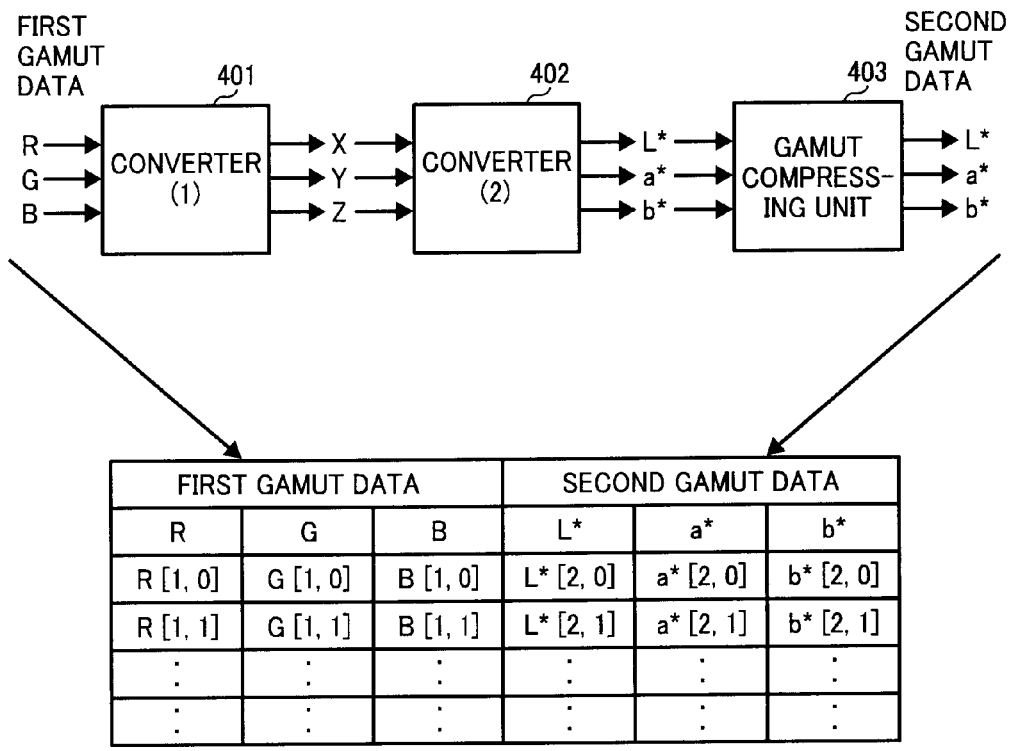
FIG. 2 is a schematic diagram for explaining color target data.
FIG. 3 is a schematic diagram for explaining a creation method of the color target data.

FIG. 2 is an example of the color target data. The color target data includes first gamut data, second gamut (virtual gamut) data associated with the first gamut data, and a specific color flag. The specific color flag can be omitted. One example of a creation method of the first and second gamut data is explained with reference to FIG. 3.

An sRGB space is divided into cubes to generate an RGB value corresponding to each lattice point. For example, each axis of R, G, and B in the sRGB space is uniformly divided into eight. In this case, the lattice points of the entire sRGB space are 9×9×9. The RGB value (R[1, i], G[1, i], and B[1, i]) at each lattice point is the first gamut data. Reference number 1 in [1, i] denotes the first gamut and i denotes a number corresponding to the lattice point (the same applies to the second gamut data).

First, a converter 401 converts the RGB value at each lattice point into a tristimulus value XYZ. This conversion is performed based on 3×3 matrix operation by $$X = \alpha 00 \times R + \alpha 01 \times G + \alpha 02 \times B$$

$$Y = \alpha 10 \times R + \alpha 11 \times G + \alpha 12 \times B$$

$$Z = \alpha 20 \times R + \alpha 21 \times G + \alpha 22 \times B \quad (1)$$

where the coefficients α00 to α22 are determined according to a light source (D50, D65, F11, or the like).

A converter 402 converts the tristimulus value XYZ to a uniform color space of the CIELAB. The conversion is expressed by $$L^* = 116 \times (Y/Y0)^{(1/3)} - 16$$

$$a^* = 500 \times [(X/X0)^{(1/3)} - (Y/Y0)^{(1/3)}]$$

$$b^* = 200 \times [(Y/Y0)^{(1/3)} - (Z/Z0)^{(1/3)}] \quad (2)$$

where Y/Y0>0.008856, and X0, Y0, and Z0 are values of a reference reflecting surface.

This L*a*b* value is then gamut-compressed to the virtual second gamut by a gamut compressing unit 403. The L*a*b* value after gamut compression is the second gamut data.

The conversion shown in FIG. 3 can be also executed based on a polynomial approximation or a neural network. Correction can be manually added, as required, to the automatically generated second gamut data. The second gamut data can be manually generated.

Referring back to FIG. 2, the specific color flag in the color target data is for identifying which the specific color is the RGB value at each lattice point in the first gamut data. The typical specific color is a primary color (a color desired to be output by using only one color of color materials of cyan, magenta, and yellow of the color-image output device). However, secondary colors (colors desired to be output by using only two colors of color materials of red, green, and blue of the color-image output device), tertiary gray (gray output by using color materials of cyan, magenta, and yellow of the color-image output device), and corporation colors (colors used for Company Logos, and managed by colorimetry or by numbers of a color chart marketed by a printing ink manufacturer) can be included in the specific color. For example, the specific color flag can be such that it indicates a color other than the specific color when the value thereof is 0, a cyan primary color when the value is 1, a magenta primary color when the value is 2, and a yellow primary color when the value is 3.

The data of the color-image output device stored in the color-image output-device DB 102 includes, for example, the third gamut data as shown in FIG. 4 and the specific color flag associated therewith, and further includes peripheral data of the gamut (the third gamut) of the color-image output device and a conversion parameter from the L*a*b* value to an output color signal value.

The gamut outermost periphery is described, for example, by a polygon as shown in FIG. 5 in the CIELAB space, and the peripheral data of the gamut indicates a coordinate (L*a*b* value) of each apex thereof.

A tone patch of a specific color is actually output by the color-image output device, and a pair of colorimetric data (L*a*b* value) thereof and the RGB value (referred to as a device RGB value in order to discriminate it from the sRGB value) corresponding thereto forms the third gamut data. For example, in the case of a cyan primary color, a plurality of cyan color patches (discrete tone patch from a low density solid patch to the highest density solid patch) is output by the color-image output device, the color of each patch is measured by a calorimeter, and calorimetric data (L*a*b* value) thereof is set as an L*a*b* value of the cyan primary color in the third gamut data. In FIG. 5, the L*a*b* values of the cyan primary color are plotted as black dots on the surface of a peripheral polygon of the gamut. Similar tone patches are output for the magenta primary color, the yellow primary color, and other specific colors, and the calorimetric data thereof are set as the L*a*b* values in the third gamut data.

The specific color flag in the color-image output device data is the same flag as the specific color flag in the color target data (FIG. 2). When the specific color flag is included, the device RBF value in the third gamut data can be omitted. Alternatively, when the device RBF value is included, the specific color flag can be omitted.

3 in "3i" of the L*a*b* values (calorimetric data) and the device RGB values in the third gamut data indicates that the gamut is the third gamut, and i is a number added to respective data.

Referring back to FIG. 1, the color profile creating apparatus includes a color-target-data storage unit 101, a color-image output-device-data storage unit 103, specific-color-data extracting units 200 and 201, a hue characteristic calculator 202, a replacement data generator 203, a specific-color-data replacing unit 206, a color-target-correction data storage unit 104, a gamut compressing unit 105, and a color-profile creating unit 106.

The color target data specified by color-target specifying data is read from the color target DB 100 and temporarily held in the color-target-data storage unit 101. The data of the color-image output device specified by color-image output-device specifying data is read from the color-image output-device DB 102, and is temporarily held in the color-image output-device-data storage unit 103.

The color target data in the color-target-data storage unit 101 is sequentially read by the specific-color-data extracting unit 200 and is transferred to the color-target-correction data storage unit 104. At this time, in the specific-color-data extracting unit 200, the second gamut data corresponding to the first gamut data of the specific color (for example, cyan primary color) specified by the specific color specifying data is extracted and transmitted to the specific-color-data replacing unit 206 and the replacement data generator 203. Alternatively, the pair of the first gamut data and the second gamut data of the specified specific color can be transmitted directly to the specific-color-data replacing unit 206. The first gamut data and the second gamut data corresponding to the first gamut data of the specified specific color may not be transmitted to the color-target-correction data storage unit 104.

When the specific color flag is included in the color target data as in the first embodiment, the specific-color-data extracting unit 200 can determine easily whether the color target is the specified specific color by checking the value of the specific color flag. When the specific color flag is not included, the specific-color-data extracting unit 200 can determine whether the specific color flag is the specified specific color based on the first gamut data (RGB value). For example, it can be determined such that:

it is cyan when (R, G, B)=(0, N, N);
it is magenta when (R, G, B)=(N, 0, N);
it is yellow when (R, G, B)=(N, N, 0);
it is red when (R, G, B)=(N, 0, 0);
it is green when (R, G, B)=(0, N, 0);
it is blue when (R, G, B)=(0, 0, N); and
it is tertiary gray when (R, G, B)=(N, N, N).

The N takes an integer of from 0 to 255 when each value of R, G, and B is eight bits. However, when a specific color such as a corporation color having no such simple regularity is included in a target, the specific color flag is added and used for the determination.

The data shown in FIG. 4 in the color-image output-device-data storage unit 103 is sequentially read by the specific-color-data extracting unit 201 to extract the third gamut data of the specific color specified by the specific color specifying data, and only the L*a*b* value thereof is transmitted to the hue characteristic calculator 202. The specific-color-data extracting unit 201 can determine easily whether the color is the specified specific color by checking the value of the specific color flag added to the third gamut data. When the specific color flag is not included, the determination focusing on the regularity can be performed based on the device RGB value.

The hue characteristic calculator 202 calculates a hue characteristic of the L*a*b* value, which is calorimetric data of the specific color transmitted from the specific-color-data extracting unit 201, (that is, a hue characteristic of the specific color in the color-image output device) and the hue characteristic information is transmitted to the replacement data generator 203. A specific hue characteristic calculation method and the specific content of the hue characteristic information will be described later.

The replacement data generator 203 performs hue correction for matching with the hue characteristic of the specific color of the color-image output device with respect to the second gamut data (the L*a*b* value) of the specific color transmitted from the specific-color-data extracting unit 200, thereby generating the replacement data reflecting the hue characteristic obtained by the hue characteristic calculator 202, while storing a tone characteristic of the second gamut data. The specific content of the hue correction will be described later.

The generated replacement data (L*a*b* value) is overwritten on the corresponding second gamut data in the color-target-correction data storage unit 104 by the specific-color-data replacing unit 206. As described above, the pair of the first and second gamut data of the specific color can be transmitted to the specific-color-data replacing unit 206. In this case, a pair of the first gamut data and the replacement data is overwritten on the corresponding data in the color-target-correction data storage unit 104. As described above, the first and second gamut data of the specified specific color may not be transmitted to the color-target-correction data storage unit 104. In this case, the pair of the first gamut data of the specific color and the replacement data is simply written additionally in the color-target-correction data storage unit 104.

Figure 14A:
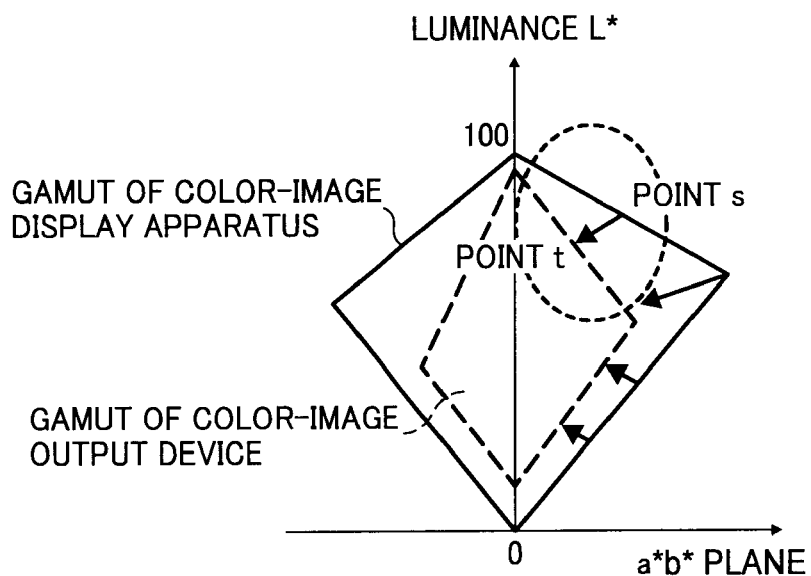
FIGS. 14A and 14B are schematic diagrams for explaining gamut compression.
Figure 14B:
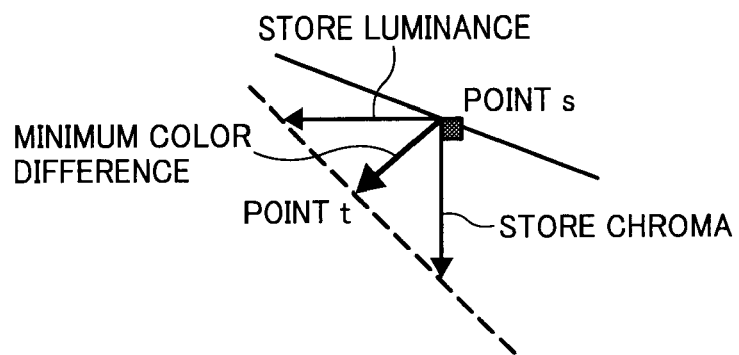
Figure 15:
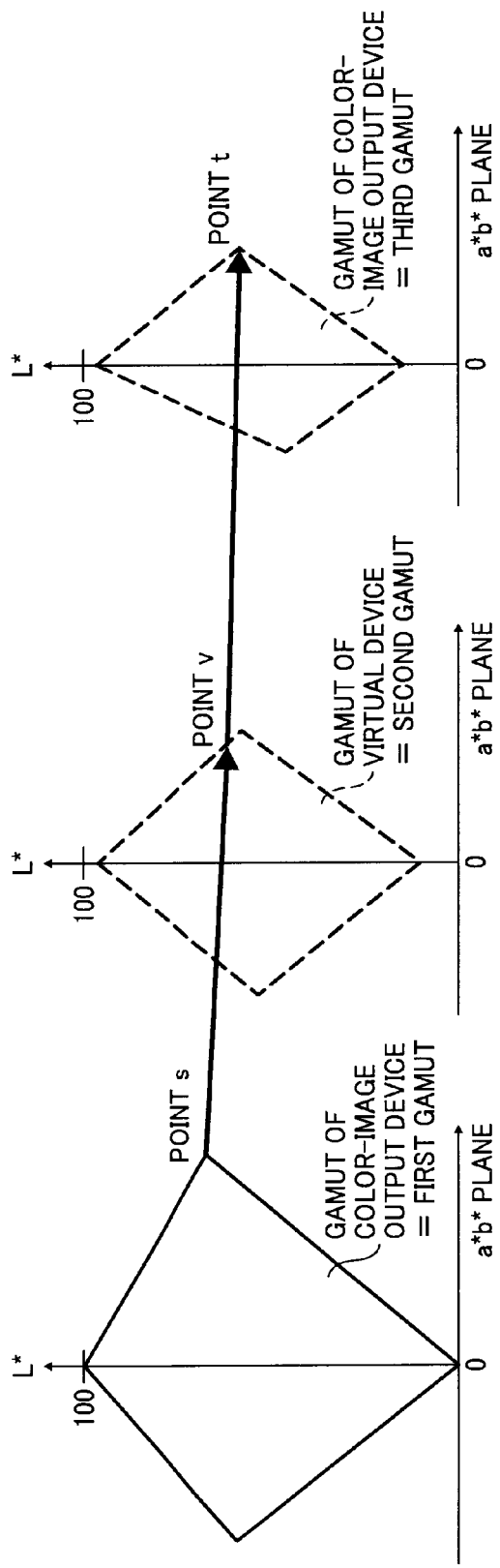
FIG. 15 is a schematic diagram for explaining two-step gamut compression including an intervening virtual gamut.

When replacement by the replacement data of the second gamut data is complete for the specified specific color, the gamut compressing unit 105 reads the outermost periphery information of the third gamut explained with reference to FIG. 5 from the color-image output-device-data storage unit 103. The gamut compressing unit 105 then sequentially reads the first and second gamut data from the color-target-correction data storage unit 104, and performs gamut compression of the second gamut data (the L*a*b* value) to the third gamut. As the gamut compression method, well-known gamut compression methods such as the compression method for making a color difference before and after the compression minimum, the compression method for saving luminance before the compression, the compression method for saving chroma before the compression, and the like as explained with reference to FIGS. 14A and 14B can be used, and therefore explanations thereof will be omitted.

Figure 6:
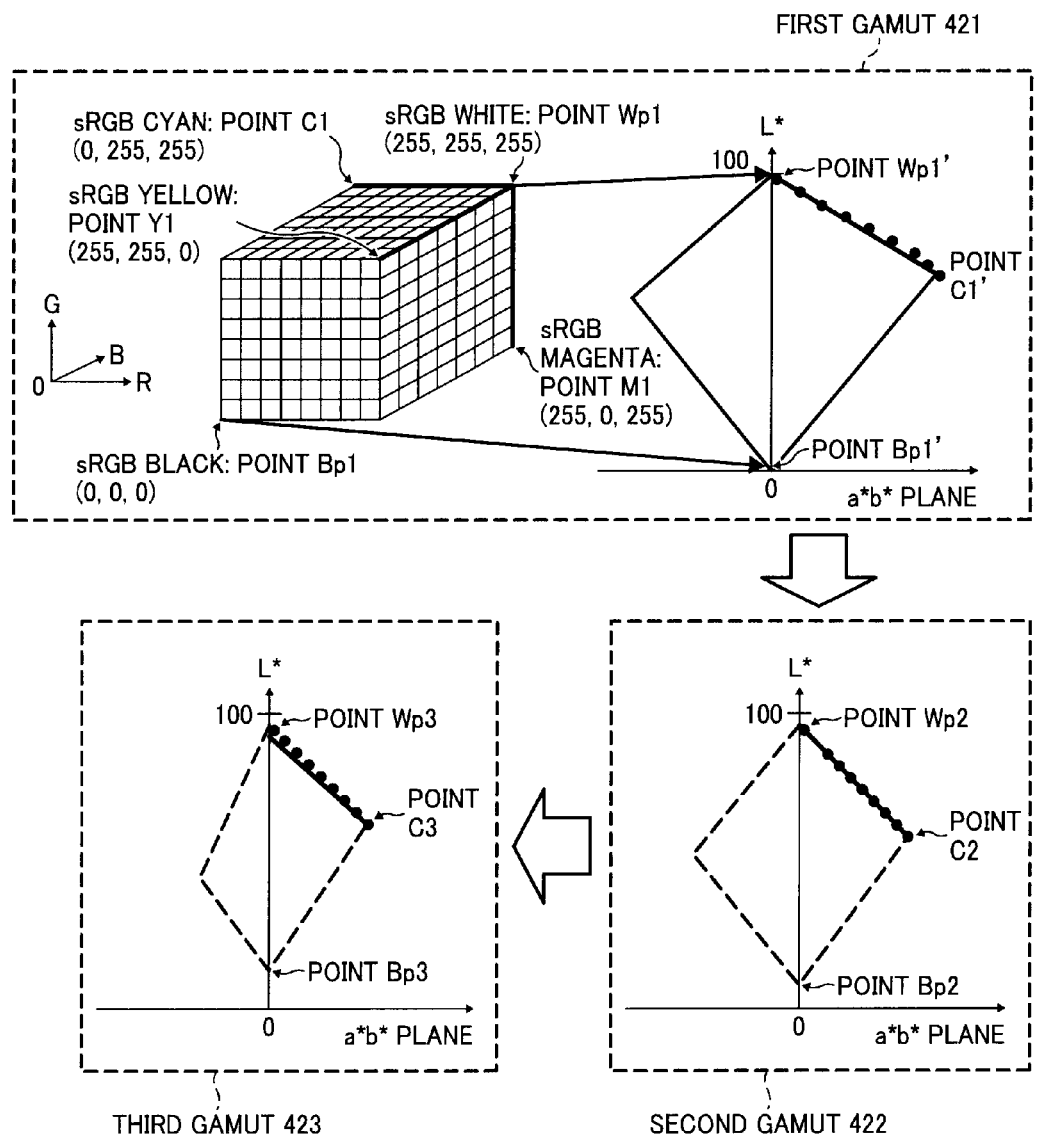
FIG. 6 is a schematic diagram for explaining processes up to gamut compression.

A supplementary explanation for the process up to the gamut compression is given with reference to FIG. 6.

The drawing in a broken line frame (first gamut) 421 in FIG. 6 explains the first gamut data, where the left drawing schematically depicts a state of cube division of the sRGB space. When respective R, G, and B axes are divided into eight, there are 9×9×9 lattice points in the entire sRGB space. Because the color-image display apparatus causes respective R, G, and B emitters to glow, the primary colors thereof are originally R, G, and B. However, it is explained with an assumption that cyan (C), magenta (M), yellow (Y), and black (B), which are colors of color materials in the color-image output device, are the primary colors. There is sRGB black: point Bp1 (0, 0, 0) at an origin of the sRGB space, and sRGB white: point Wp1 (255, 255, 255) is at the farthest point. The points indicating the highest chroma of the primary colors are, respectively, sRGB cyan: point C1 (0, 255, 255), sRGB magenta: point M1 (255, 0, 255), and sRGB yellow: point Y1 (255, 255, 0). A thick line from point Wp1 to point C1, a thick line from point Wp1 to point M1, and a thick line from point Wp1 to point Y1 indicate respective primary colors.

The right drawing in the broken line frame 421 depicts a state where the nine points at the lattice points, which are sRGB cyan primary color, are converted to the L*a*b* value and plotted. A square in the drawing indicates the outermost periphery of the first gamut. The primary color is on the gamut outermost periphery, and point Wp1 corresponds to point Wp1', point Bp1 corresponds to point Bp1', and point C1 corresponds to point C1'. The cyan primary color is explained below as an example of the specific color.

A state where the cyan primary color is gamut-compressed to the virtual second gamut is shown schematically in a broken line frame (second gamut) 422 in FIG. 6. A broken-line square indicates the outermost periphery of the virtual second gamut. In this example, point Wp1' of the first gamut is compressed to point Wp2, point Bp1' is compressed to point Bp2, and point C1 is compressed to point C2. The L*a*b* value gamut-compressed in this manner corresponds to the second gamut data of the cyan primary color.

To ensure excellent color reproduction of the specific color in the color-image output device, in the first embodiment, the hue of the second gamut data of the specified specific color is corrected. That is, when the cyan primary color is specified, the hue of the second gamut data of the cyan primary color shown in the broken line frame 422 is corrected, to match with the hue characteristic of the calorimetric data (the L*a*b* value in the third gamut data) of the cyan tone patch output by the color-image output device. Correction of the hue is performed by replacing the second gamut data by the replacement data as described above. The second gamut data of cyan in which the hue has been corrected in this manner becomes a target of the gamut compression in the gamut compressing unit 105.

A state where the second gamut data of cyan with phase being corrected is gamut-compressed to the outermost periphery of the third gamut is shown in a broken line frame (third gamut) 423 in FIG. 6. A broken-line square indicates the outermost periphery of the third gamut. Point Wp2 corresponds to point Wp3, point Bp2 corresponds to point Bp3, and point C2 corresponds to point C3.

Figure 7:
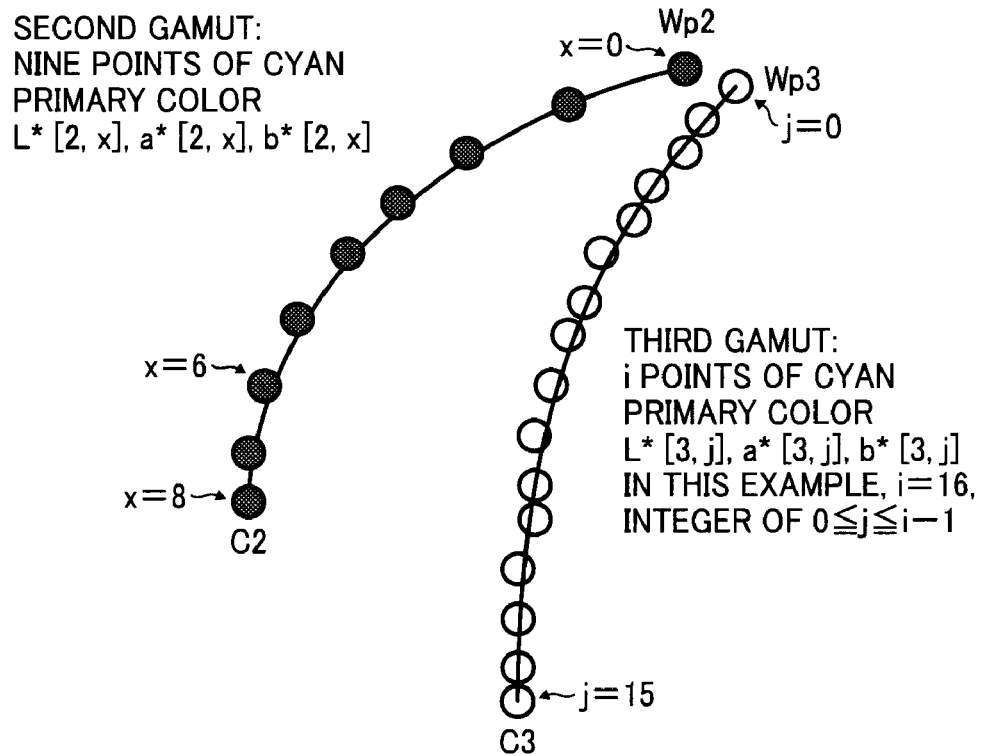
FIG. 7 depicts nine points of the cyan primary color of a second gamut and 16 points of the cyan primary color of the third gamut.

A specific example of hue characteristic calculation by the hue characteristic calculator 202 and hue correction by the replacement data generator 203 in the hue characteristic calculator 202 are explained, with reference to FIG. 7. The cyan primary color is explained here as an example.

In FIG. 7, nine points (L*[2, x], a*[2, x], b*[2, x]; x=0, 1, ..., 8) in the second gamut data corresponding to the cyan primary color extracted by the specific-color-data extracting unit 200 are plotted with black dots, and 16 points (L*[3, j], a*[3, j], b*[3, j]; j=0, 1, ..., 15) in the third gamut data (calorimetric data) for the cyan primary color extracted by the specific-color-data extracting unit 201 are plotted with white dots.

In the hue characteristic calculator 202, a*[3, j] and b*[3, j] of 16 points of the primary color in the third gamut data are substituted for Equations (3) and (4), to determine chroma C[3, j] and hue H[3, j] of all points.

$$C = \sqrt{(a^* \times a^* + b^* \times b^*)} \quad (3)$$

$$H = a\tan 2(a^*, b^*) \times 180/\pi \quad (4)$$

where H=0 when a*=b*=0, and H=360+H when H<0.

In the hue characteristic calculator 202, Equation (5) is derived from the calculated chroma C[3, j] for predicting the hue H[3, j].

$$H[3,j] = f0(C[3,j]) \quad (5)$$

Function f0( ) is, for example, an approximating polynomial. That is, in this example, the function f0( ) for predicting the hue from the chroma is obtained as the hue characteristic.

In the hue characteristic calculator 202, a*[2, x] and b*[2, x] of nine points of the cyan primary color in the second gamut data are substituted for Equation (3), to obtain chroma C[2, x]. The obtained chroma is substituted for the function f0( ) (that is, replaced by C[3, j] in Equation (5)), to obtain the hue H[2, x]. That is, calculation of Equation (6) is performed.

$$H[2,x] = f0(C[2,x]) \quad (6)$$

The calculated hue H[2, x] is reflected on nine points of the cyan primary color. Specifically, a*[2, x]' and b*[2, x]' of nine points with the hue being corrected are calculated by $$a^*[2,x]' = C[2,x] \times \cos(H[2,x] \times \pi/180) \quad (7)$$

$$b^*[2,x]' = C[2,x] \times \sin(H[2,x] \times \pi/180) \quad (8)$$

The L*a*b* value (L*[2, x], a*[2, x], b*[2, x]) of nine points of the cyan primary color in the second gamut data are replaced by the L*a*b* value (L*[2, x], a*[2, x]', b*[2, x]') of nine points with the hue being corrected. Thus, hue correction has been performed with respect to nine points of the cyan primary color in the second gamut data, to match with the hue characteristic of the cyan primary color in the third gamut data.

Figure 8:
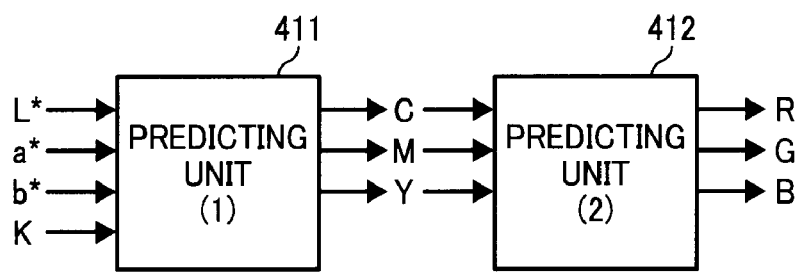
FIG. 8 is a schematic diagram for explaining conversion from an L*a*b* value to a device RGB value in a color profile creating apparatus.

Referring back to FIG. 1, the color-profile creating unit 106 is explained. The first gamut data (sRGB value at each lattice point) of the color target data and the data (L*a*b* value) after gamut compression of the second gamut data (L*a*b* value) corresponding thereto are input from the gamut compressing unit 105 to the color-profile creating unit 106. When it is assumed that the color profile for converting an sRGB signal to a device RGB signal is to be created, the color-profile creating unit 106 first performs a process for converting the L*a*b* value of the second gamut data after gamut compression to the device RGB value. This conversion is performed such that, for example as shown in FIG. 8, conversion from the L*a*b* value to a CMY value is performed by a predicting unit 411 (for example, neural network), and conversion from the CMY value to the device RGB value is performed by a predicting unit 412 (for example, a polynomial approximation unit). Parameters (a neural network parameter and a polynomial approximation parameter) of the predicting units 411 and 412 are included in data of the color-image output device in the color-image output-device-data storage unit 103, and are read by the color-profile creating unit 106 and used for conversion.

After such conversion, the color-profile creating unit 106 creates a three-dimensional lookup table, as the color profile, in which, for example, a device RGB value corresponding to each lattice point is stored in an address corresponding to each lattice point in the sRGB space (determined based on the sRGB value at the lattice point).

Figure 9:
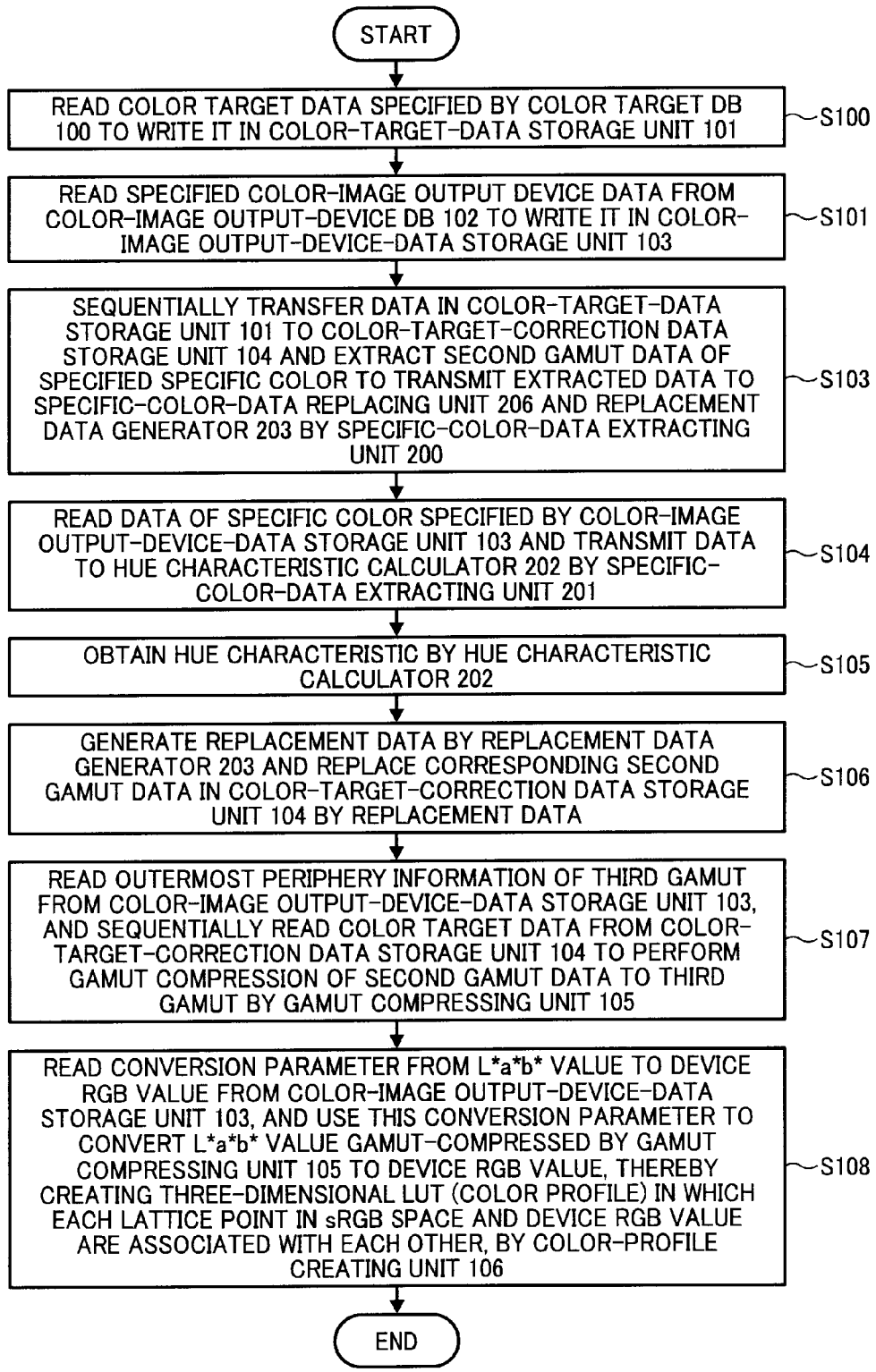
FIG. 9 is a flowchart of an outline of a process operation in a second embodiment of the present invention.

FIG. 9 depicts an outline of the explained process operation as a process flow. In FIG. 9, S100 denotes a step of reading the color target data into the color-target-data storage unit 101, S101 denotes a step of reading the color-image output device data in the color-image output-device-data storage unit 103, S103 denotes a processing step of the specific-color-data extracting units 200, S104 denotes a processing step of the specific-color-data extracting unit 201, S105 denotes a processing step of the hue characteristic calculator 202, S106 denotes a processing step of the replacement data generator 203 and the specific-color-data replacing unit 206, S107 denotes a processing step of the gamut compressing unit 105, and S108 denotes a processing step of the color-profile creating unit 106. The process flow is one example of a process procedure of a color-profile creating method. Time context of respective steps in FIG. 9 can be appropriately changed. For example, after processes at steps S101, S104, and S105 are continuously executed, processes at steps S100, S103, and S106 can be executed continuously. Further, processes at a plurality of steps (for example, S100 and S101) can be executed concurrently.

The process procedure shown in FIG. 9 can be easily executed by software by using hardware resources of a general computer system. A program therefor, that is, a program for causing a computer to execute the processing step shown in FIG. 9 or a program for causing a computer to function as respective parts of the color profile creating apparatus shown in FIG. 1, and various computer readable recording (storage) media such as a magnetic disk, an optical disk, a magneto-optical disk, a semiconductor storage device, and the like, on which the program is recorded, can be included in the present invention.

According to the first embodiment, a person who creates a color profile can specify a specific color, for which it is desired to give much weight to color reproducibility, through the specific color specifying data, thereby creating the color profile, with excellent color reproducibility of the specific color being ensured in the color-image output device. Further, the person who creates the color profile can appropriately select a combination of the color-image output device and the color target through denotes color target specifying data.

Alternatively, replacement (hue correction) of the color target data in the color-target-data storage unit 101 by the replacement data for the specific color specified by the specific-color-data replacing unit 206 can be performed, without providing the color-target-correction data storage unit 104, and after the replacement process is complete, the color target data in the color-target-data storage unit 101 can be read by the gamut compressing unit 105. In the first embodiment, a color profile in which the sRGB signal is used for an input color signal and the device RGB signal is used for an output color signal is created. However, the present invention is not limited to such a color profile.

Figure 10:
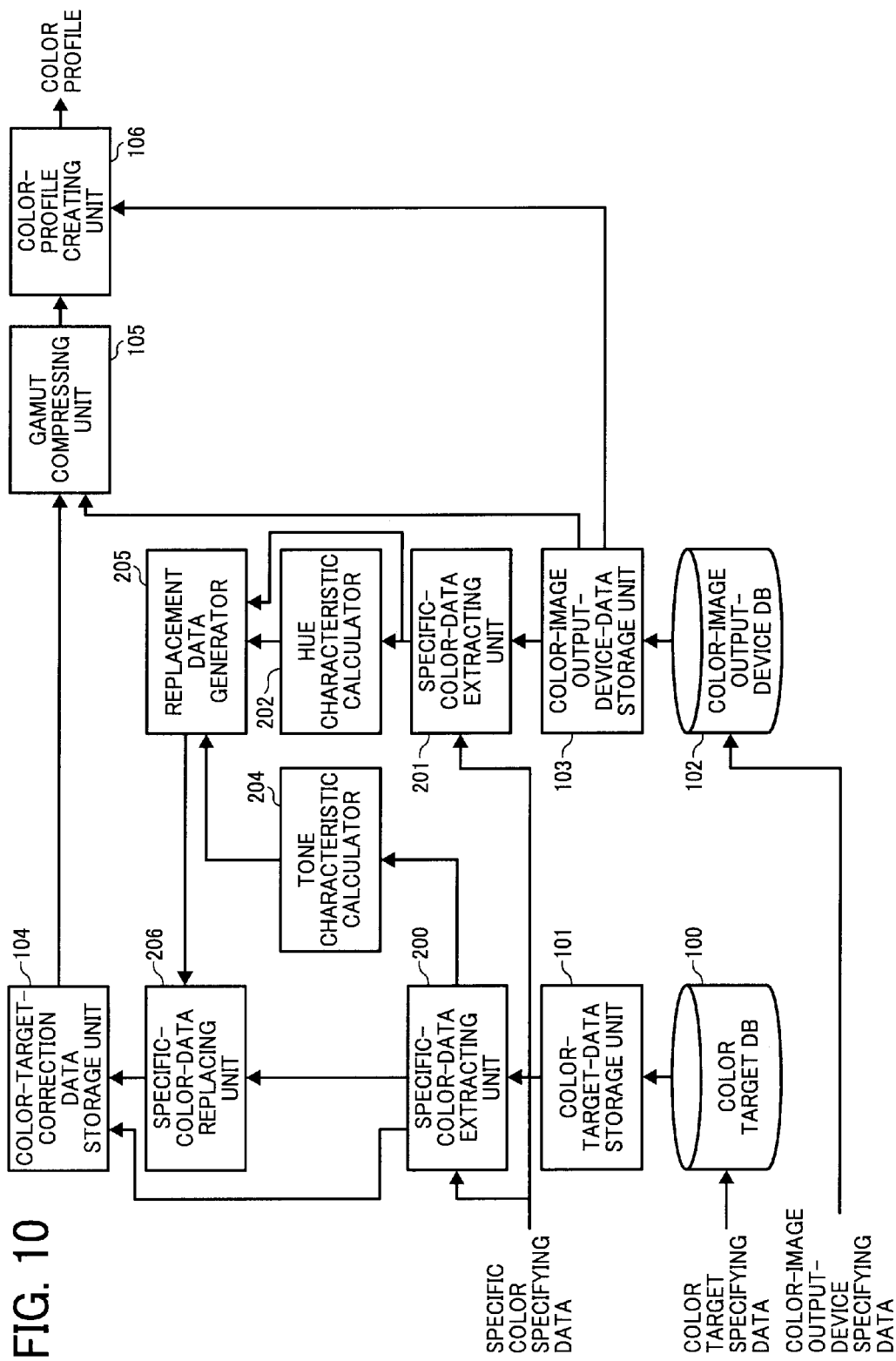
FIG. 10 is a block diagram of the color profile creating apparatus according to the second embodiment.

A second embodiment of the present invention is explained next. FIG. 10 is a block diagram of a configuration of the color profile creating apparatus according to the second embodiment. In the second embodiment, as is apparent from comparison between FIG. 10 and FIG. 1, the replacement data generator 203 in the first embodiment is replaced by a replacement data generator 205, and a tone characteristic calculator 204 is added. A point different from the first embodiment is explained below.

The tone characteristic calculator 204 calculates tone characteristic of the second gamut data corresponding to the specific color extracted by the specific-color-data extracting unit 200. The cyan primary color is specified here as the specific color, and it is explained by assuming that nine points (L*[2, x], a*[2, x], b*[2, x]; x=0, 1, ..., 8) plotted with block dots in FIG. 7 are present as the second gamut data corresponding to the cyan primary color, and 16 points (L*[3, j], a*[3, j], b*[3, j]; j=0, 1, ..., 15) plotted with white dots in FIG. 7 are present as the third gamut data for the cyan primary color.

The tone characteristic calculator 204 calculates the chroma C[2, x] of the nine points of the cyan primary color in the second gamut data according to Equation (3). A prediction expression of the chroma C[2, x] and luminance L*[2, x] with an input of [2, x] is obtained. That is, $$C[2,x]=f1([2,x]) \tag{9}$$

$$L^*[2,x]=f2([2,x]) \tag{10}$$

where functions f1( ) and f2( ) are, for example, approximating polynomials.

It is assumed here that parameters (polynomial approximation parameters) of these functions f1( ) and f2( ) are transmitted to the replacement data generator 205 as tone characteristic information.

Figure 11A:
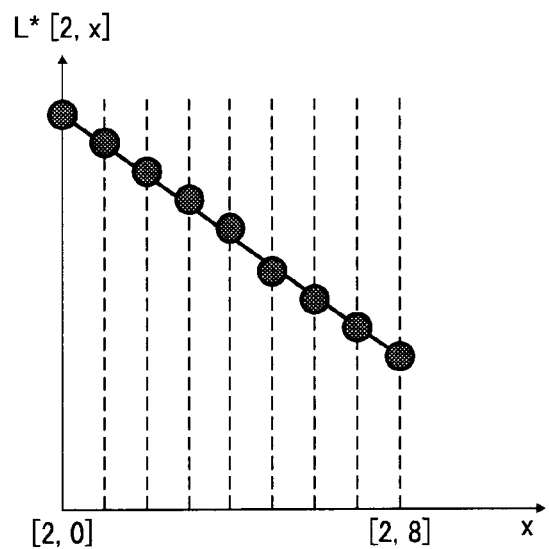
FIGS. 11A and 11B are graphs of an example of tone characteristics of luminance and chroma of the cyan primary color of the second gamut.
Figure 11B:
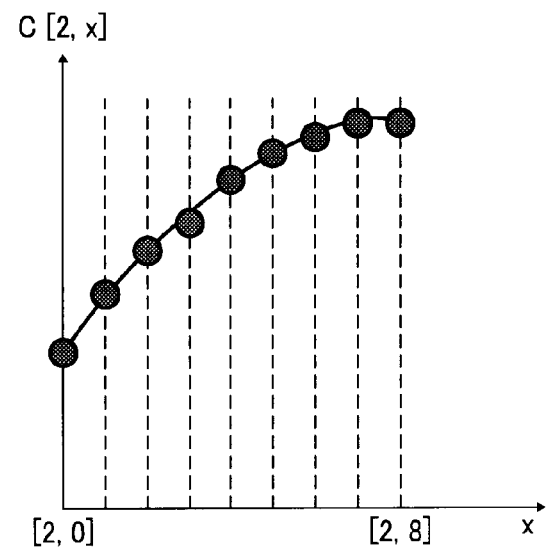

When a prediction result of Equation (10) is, as shown in FIG. 11A, such that the luminance L*[2, x] shows a change close to linear with an increase of x, it is seen that the cyan primary color in the second gamut has a linear tone characteristic with respect to the luminance. Further, when a prediction result of Equation (9) is, as shown in FIG. 11B, such that the chroma C[2, x] shows a change curving concave upward, it is seen that the cyan primary color in the second gamut has a tone characteristic with much weight being given to high chroma with respect to the chroma. Such a tone characteristic pattern can be transmitted to the replacement data generator 205 as the tone characteristic information, so that tone correction can be performed matched with the tone characteristic pattern.

Processes performed by the replacement data generator 205 are explained next. The replacement data generator 205 calculates chroma C[3, j] after tone correction with respect to 16 points of the cyan primary color in the third gamut, by $$C[3,j]=f1([3,j]) \tag{11}$$

In this example, because there are 16 points of the cyan primary color in the third gamut with respect to nine points of the cyan primary color in the second gamut, chroma C[3, x] of nine points is obtained by normalizing an axis [3, j]. That is, $$C[3,x]=f1([3,x]) \tag{12}$$

Figure 12A:
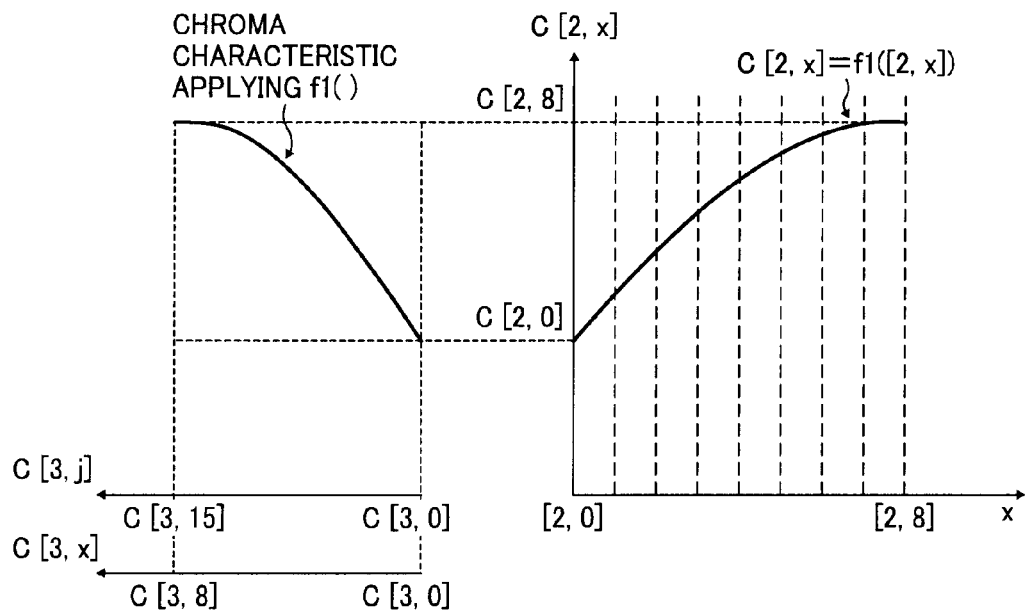
FIGS. 12A and 12B are schematic diagrams for explaining a tone correction in a replacement data generator.

In FIG. 12A, the right graph depicts chroma characteristic of nine points of the cyan primary color in the second gamut, and the left graph depicts chroma C[3, j] calculated according to Equation (11) and the characteristic of chroma C[3, x] calculated (normalized) according to Equation (12).

The luminance of 16 points of the cyan primary color in the third gamut is calculated in the same manner, $$L^*[3,j]=f2([3,j]) \tag{13}$$

and the luminance normalized to nine points is also obtained.

$$L^*[3,x]=f2([3,x]) \tag{14}$$

Figure 12B:
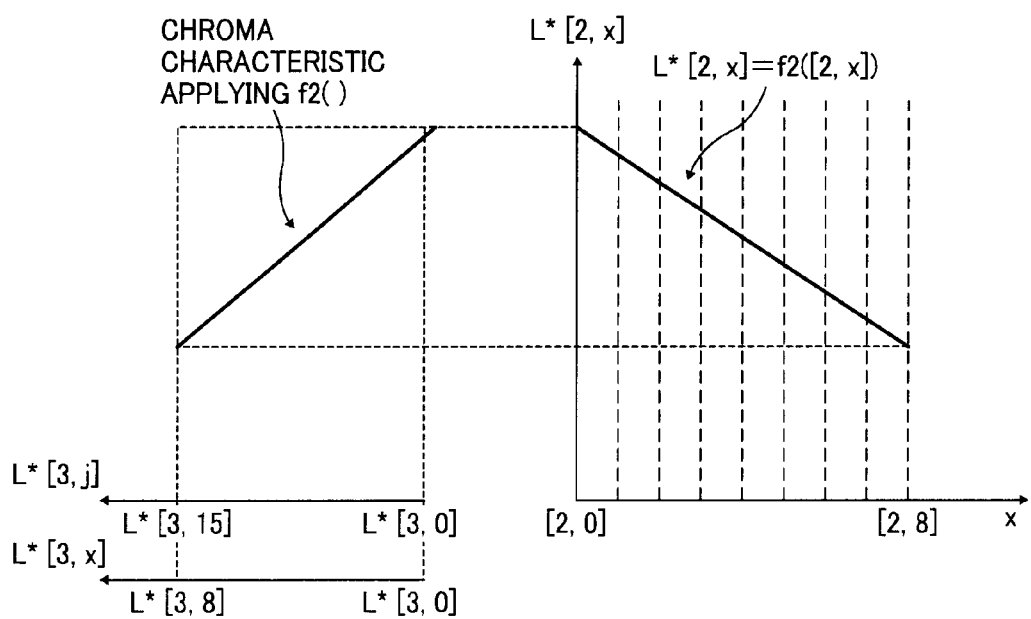

In FIG. 12B, the right graph depicts luminance characteristic of nine points of the cyan primary color in the second gamut, and the left graph depicts the luminance L*[3, j] calculated according to Equation (13) and the characteristic of luminance L*[3, x] calculated (normalized) according to Equation (14).

The hue is also normalized, to obtain the hue of nine points, by $$H[3,x]=f0(C[3,x]) \tag{15}$$

where function f0( ) is for predicting the hue obtained by the hue characteristic calculator 202 (see Equation (5)).

The hue H[3, x] and C[3, x] of nine points are substituted for H[2, x] and C[2, x] in Equations (7) and (9), to obtain a*[3, x]' and b*[3, x]'. The data of nine points of the cyan primary color (L*[3, x], a*[3, x]' and b*[3, x]') obtained in this manner are the replacement data for the second gamut data corresponding to the cyan primary color. As is apparent from the above explanation, the replacement data reflect the phase characteristic of the third gamut data, that is, the calorimetric data for the cyan primary color, and the original tone characteristic of the second gamut data corresponding to the cyan primary color.

The replacement data generated by the replacement data generator 205 is transmitted to the specific-color-data replacing unit 206. The specific-color-data replacing unit 206 overwrites the original second gamut data (L*[2, x], a*[2, x]' and b*[2, x]') corresponding to the cyan primary color in the color-target-correction data storage unit 104 by the replacement data (L*[3, x], a*[3, x]' and b*[3, x]'). When the second gamut data of the specified specific color has not been transferred beforehand to the color-target-correction data storage unit 104, the replacement data needs only to be added and written therein. When both the first gamut data and the second gamut data of the specified specific color has not been transferred beforehand to the color-target-correction data storage unit 104, the replacement data generator 205 adds and writes a pair of the original first gamut data of the specific color and the replacement data in the color-target-correction data storage unit 104.

Figure 13:
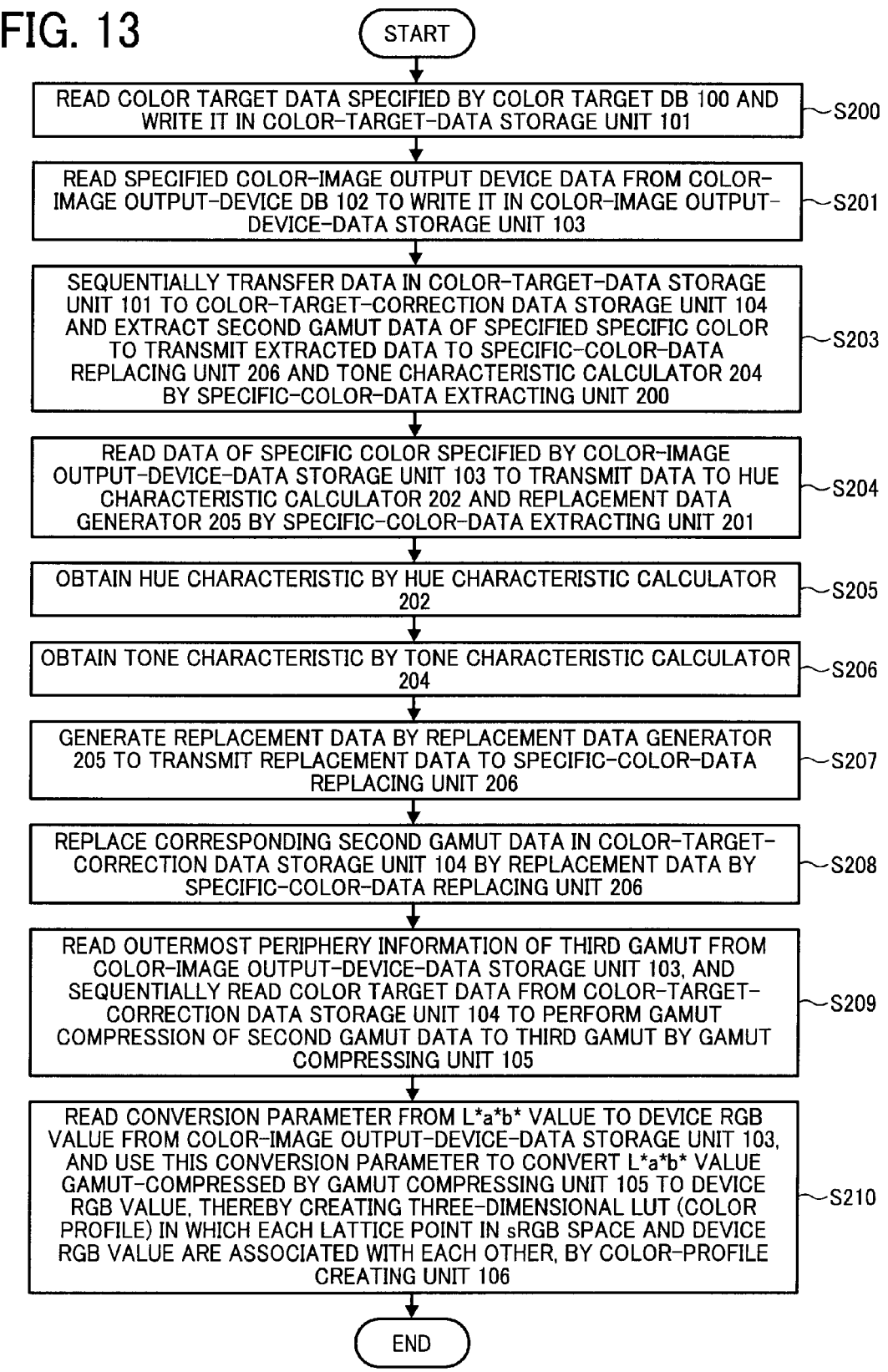
FIG. 13 is a flowchart of an outline of a process operation in the second embodiment.

FIG. 13 depicts an outline of the explained process operation as a process flow. In FIG. 13, S200 denotes a step of reading the color target data into the color-target-data storage unit 101, S201 denotes a step of reading the color-image output device data into the color-image output-device-data storage unit 103, S203 denotes a processing step by the specific-color-data extracting unit 200, S204 denotes a processing step by the specific-color-data extracting unit 201, S205 denotes a processing step by the hue characteristic calculator 202, S206 denotes a processing step by the tone characteristic calculator 204, S207 denotes a processing step by the replacement data generator 205, S208 denotes a processing step by the specific-color-data replacing unit 206, S209 denotes a processing step by the gamut compressing unit 105, and S210 denotes a processing step by the color-profile creating unit 106. The process flow is one example of a process procedure of the color-profile creating method according to the present invention. Time context of respective steps in FIG. 13 can be appropriately changed. For example, after processes at steps S201, S204, and S205 are continuously executed, processes at steps S200, S203, S206, S207, and S208 can be executed continuously. Further, processes at a plurality of steps (for example, S200 and S201) can be executed concurrently.

Further, the process procedure as shown in FIG. 13 can be easily executed by software by using hardware resources of the general computer system. A program therefor, that is, a program for causing a computer to execute the processing step shown in FIG. 13 or a program for causing a computer to function as respective parts of the color profile creating apparatus shown in FIG. 10, and various computer readable recording (storage) media such as a magnetic disk, an optical disk, a magneto-optical disk, a semiconductor storage device, and the like, on which the program is recorded, can be included in the present invention.

According to the second embodiment, similarly to the first embodiment, the person who creates the color profile can specify a specific color, for which it is desired to give much weight to color reproducibility, through the specific color specifying data, thereby creating the color profile, with excellent color reproducibility of the specific color being ensured in the color-image output device. Further, the person who creates the color profile can appropriately select a combination of the color-image output device and the color target through the color target specifying data.

Alternatively, the replacement process of the color target data in the color-target-data storage unit 101 by the specific color data specified by the specific-color-data replacing unit 206 can be performed, without providing the color-target-correction data storage unit 104, and the color target data in the color-target-data storage unit 101 can be read by the gamut compressing unit 105. In the second embodiment, a color profile in which the sRGB signal is used for the input color signal and the device RGB signal is used for the output color signal is created. However, the present invention is not limited to such a color profile.

As described above, according to an aspect of the present invention, the color profile creating apparatus and the color profile creation method that can create a color profile with excellent color reproducibility being ensured for the specific color in the color-image output device, a program for causing the computer to execute the method, and a computer readable recording medium on which the program is recorded can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color profile creating apparatus including first gamut data having a first gamut, second gamut data obtained by compressing the first gamut data to a second gamut, and colorimetric data of a tone patch of a specific color output by a color-image output device having a third gamut, the color profile creating apparatus comprising:
    a storage unit that stores the first gamut data including at least one entry including a flag designating the specific color;
    a gamut compressing unit that compresses the second gamut data to the third gamut;
    a hue-characteristic obtaining unit that obtains a hue characteristic of the colorimetric data for the specific color based on the flag;
    a replacement data generator that generates replacement data for the second gamut data, on which a tone characteristic of the second gamut data and the hue characteristic obtained by the hue-characteristic obtaining unit are reflected, based on the second gamut data corresponding to the first gamut data of the specific color;
    a data replacing unit that replaces the second gamut data corresponding to the first gamut data of the specific color with the replacement data generated by the replacement data generator, prior to a gamut compression by the gamut compressing unit; and
    a color-profile creating unit that creates a color profile for the color-image output device based on color data after the gamut compression by the gamut compressing unit and the first gamut data.

2. The color profile creating apparatus according to claim 1, wherein the specific color is either one of a primary color that should be output by a single color material and a secondary color that should be output by two color materials in the color-image output device.

3. The color profile creating apparatus according to claim 1, wherein
    the second gamut is narrower than the first gamut, and
    the third gamut is narrower than the second gamut.

4. A color profile creating apparatus including first gamut data having a first gamut, second gamut data obtained by compressing the first gamut data to a second gamut, and colorimetric data of a tone patch of a specific color output by a color-image output device having a third gamut, the color profile creating apparatus comprising:
    a storage unit that stores the first gamut data including at least one entry including a flag designating the specific color;
    a gamut compressing unit that compresses the second gamut data to the third gamut;
    a hue-characteristic obtaining unit that obtains a hue characteristic of the colorimetric data;
    a tone-characteristic obtaining unit that obtains a tone characteristic of the second gamut data corresponding to the first gamut data of the specific color based on the flag;
    a replacement data generator that generates replacement data for the second gamut data corresponding to the first gamut data of the specific color, on which the hue characteristic obtained by the hue-characteristic obtaining unit and the tone characteristic obtained by the tone-characteristic obtaining unit are reflected, based on the colorimetric data for the specific color;
    a data replacing unit that replaces the second gamut data corresponding to the first gamut data of the specific color with the replacement data generated by the replacement data generator, prior to a gamut compression by the gamut compressing unit; and
    a color-profile creating unit that creates a color profile for the color-image output device based on color data after the gamut compression by the gamut compressing unit and the first gamut data.

5. The color profile creating apparatus according to claim 4, wherein the specific color is either one of a primary color that should be output by a single color material and a secondary color that should be output by two color materials in the color-image output device.

6. The color profile creating apparatus according to claim 4, wherein
    the second gamut is narrower than the first gamut, and
    the third gamut is narrower than the second gamut.

7. A color profile creating method comprising:
data obtaining including obtaining first gamut data having a first gamut and including at least one entry including a flag designating a specific color, second gamut data obtained by compressing the first gamut data to a second gamut, and colorimetric data of a tone patch of the specific color output by a color-image output device having a third gamut;
gamut compressing including compressing the second gamut data to the third gamut;
hue-characteristic obtaining including obtaining a hue characteristic of the colorimetric data for the specific color based on the flag;
replacement data generating including generating replacement data for the second gamut data, on which a tone characteristic of the second gamut data and the hue characteristic obtained at the hue-characteristic obtaining are reflected, based on the second gamut data corresponding to the first gamut data of the specific color;
data replacing including replacing the second gamut data corresponding to the first gamut data of the specific color with the replacement data generated at the replacement data generating, prior to a gamut compression at the gamut compressing; and
color profile creating including creating a color profile for the color-image output device based on color data after the gamut compression at the gamut compressing and the first gamut data.

8. The color profile creating method according to claim 7, wherein the specific color is either one of a primary color that should be output by a single color material and a secondary color that should be output by two color materials in the color-image output device.

9. The color profile creating method according to claim 7, wherein
the second gamut is narrower than the first gamut, and
the third gamut is narrower than the second gamut.

* * * * *